Tranter, Kinsey & Carr,
Cultivator.
No. 107,639. Patented Sep. 20, 1870.

ATTEST.
Jas. H. Layman.
William Bauer

J. Tranter
J. Kinsey
J. M. Carr
INVENTORS.
By Knight Bros.
Attorneys

N. PETERS, PHOTO-LITHOGRAPHER, WASHINGTON, D. C.

UNITED STATES PATENT OFFICE.

JAMES TRANTER, JOSEPH KINSEY, AND JOHN M. CARR, OF CINCINNATI, OHIO.

IMPROVEMENT IN ROTARY POWER-PLOWS.

Specification forming part of Letters Patent No. 107,639, dated September 20, 1870.

*To all whom it may concern:*

Be it known that we, JAMES TRANTER, JOSEPH KINSEY, and JOHN M. CARR, all of Cincinnati, Hamilton county, Ohio, have invented a new and useful Rotary Power-Plow, of which the following is a specification.

Our device, in its preferred form, consists, essentially, of a gang or series of shares or plows, to which are imparted a continuous rotary and an intermittent vertical motion, accompanying a continuous advance of the revolving gang of plows along the surface of the field in the act of plowing.

Figure 1:
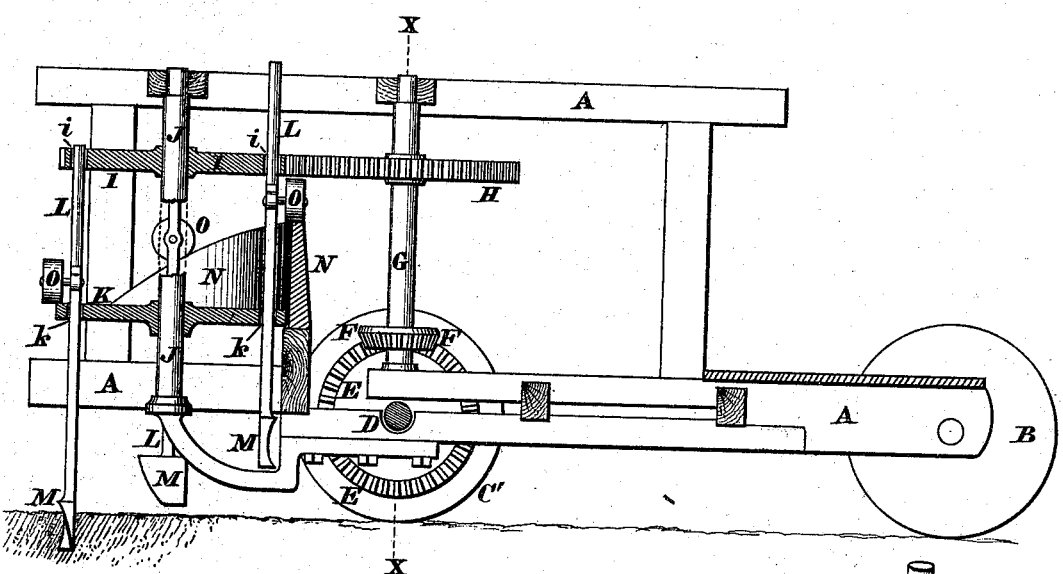
Figure 2:
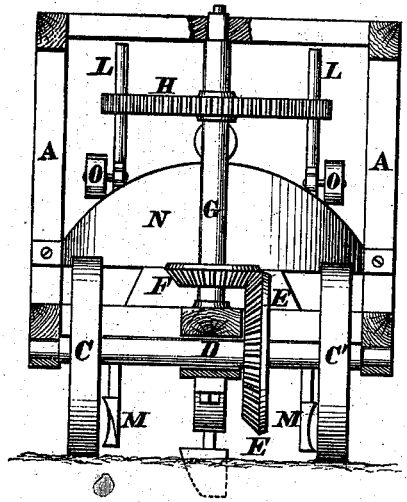
Figure 4:
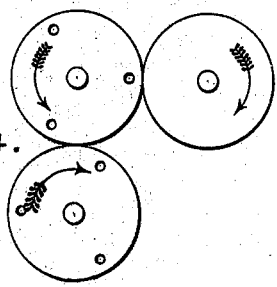
Figures 3, 5, 6:
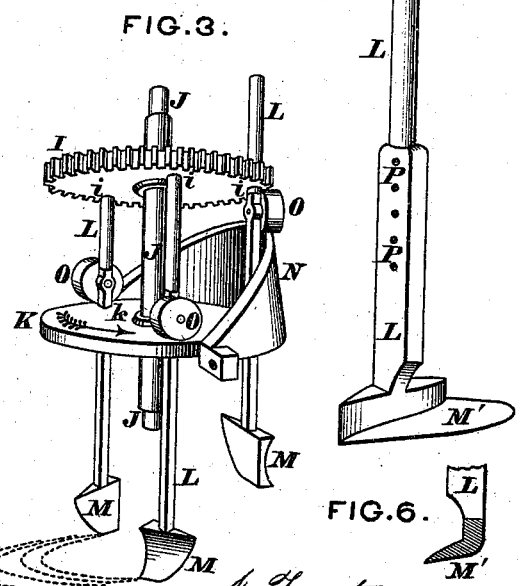

In the drawings, Figure 1 is a longitudinal section of a machine embodying our invention. Fig. 2 is a transverse section on the line $x\ x$. Fig. 3 is a perspective view of the operative devices (gang of plows) detached. Fig. 4 is a diagram showing a modification of our invention. Figs. 5 and 6 are respectively a perspective view and a vertical section of a modification of our plow for cutting sod.

A represents a frame mounted upon three ground-wheels, B C C', of which the two rear wheels, C C', are firmly secured to a common axle, D, carrying a bevel-wheel, E, which gears with a pinion, F, upon a vertical shaft, G, whose spur-wheel H gears with a similar wheel, I, upon a second vertical shaft, J, which shaft has a disk or collar, K, having square or other non-circular perforations $k$, for the stems or sheths L of a series of shares or plows proper, M. In a line with the perforations $k$ the wheel I has other perforations, $i$, for said stems to work up and down in.

Affixed to the frame, and encircling the front half of the collar K, is an incline or fixed cam, N.

Journaled to the stem of each plow is a roller, O, which, revolving during one-half of its circuit on the collar K, maintains its respective plow at a given depth for that portion of its rotation, whence, passing onto and ascending the cam N, the roller operates to unearth the plow, and to hold it out of the ground during its passage around the other half of its circuit.

In order to enable the husbandman to set the plows to penetrate any depth desired, the stem of each plow has a series of sockets, P, for the stud-shaft O of its roller.

The shaft J, with its perforated wheels or collars I and K, we call the "revolving head," I J K.

The effective capacity of the machine may be increased, and at the same time side draft prevented, by the introduction of a second series or rotary gang, revolving in the opposite direction to the first, as in Fig. 4.

The ground-wheels C C' may, if desired, be so connected by ratchets to their axles as to rotate the latter in a forward motion only of the carriage.

For the removal and overturning of the surface-sod we employ a plow or share, M'—such as represented in Figs. 5 and 6—the vertical adjustment of the said plow being such as to but slightly penetrate the ground in the manner required in sod-plowing.

The represented oval or convex contour and described motion of the plows' cutting-edges enables them to act with a draw cut or curving action upon the ground, and to surmount rocks or other immovable obstructions, so as to produce the desired effect with the least expenditure of power, whether of steam or animal, stirring the ground by a succession of semicircular furrows. (See dotted lines in Fig. 4.)

We claim as new and of our invention—

1. The revolving head or heads I J K, armed with the series of movable plows or shares M M', adapted to operate upon the soil in the manner set forth.

2. The described arrangement of one or more series of plows, M or M', rotating head I J K, and fixed cam N, whereby the said plows are subjected, during the advance of the machine, to a continuous rotation, partly in and partly out of the ground.

3. In the described combination with the elements of the clause next preceding, the described arrangement of adjustable roller O, whereby the penetration of the plow is controlled.

In testimony of which invention we hereunto set our hands.

JAMES TRANTER.
    JOSEPH KINSEY.
    JNO. M. CARR.

Witnesses:
 GEO. H. KNIGHT,
 JAMES H. LAYMAN.